(12) United States Patent
Ordonez Ruiz et al.

(10) Patent No.: US 8,650,521 B1
(45) Date of Patent: Feb. 11, 2014

(54) DENDRITIC COOLING LAYER GENERATOR AND METHOD OF FABRICATION

(71) Applicant: The Florida State University Research Foundation, Inc., Tallahassee, FL (US)

(72) Inventors: Juan Carlos Ordonez Ruiz, Tallahassee, FL (US); Camilo Ordonez Ruiz, Tallahassee, FL (US); Jeferson Avila Souza, Rio Grande (BR); Jose Viriato Coelho Vargas, Curitiba (BR)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 13/692,544

(22) Filed: Dec. 3, 2012

Related U.S. Application Data

(60) Provisional application No. 61/565,583, filed on Dec. 1, 2011.

(51) Int. Cl.
*G06F 17/50* (2006.01)

(52) U.S. Cl.
USPC .......................................................... 716/110

(58) Field of Classification Search
USPC .......................................................... 716/110
See application file for complete search history.

(56) References Cited

U.S. PATENT DOCUMENTS

| | | | | |
|---|---|---|---|---|
| 5,661,902 | A * | 9/1997 | Katchmar | 29/840 |
| 5,911,843 | A * | 6/1999 | Bergsma | 148/550 |
| 2010/0103623 | A1* | 4/2010 | Kwank et al. | 361/709 |
| 2013/0255925 | A1* | 10/2013 | Koontz et al. | 165/168 |

OTHER PUBLICATIONS

Almogbel, M., Bejan, A., 1999, Conduction Trees with Spacings at the Tips, International Journal of Heat and Mass Transfer, vol. 42, pp. 3739-3756.
Boichot, R., Luo, L., Fan, Y., 2009, Tree-network Structure Generation for Heat Conduction by Cellular Automaton, Energy Conversion and Management, vol. 50, pp. 376-386.
Errera, M. R., Bejan, A., 1998, Deterministic Tree Networks for River Drainage Basin, Fractals, vol. 6, No. 3, pp. 245-261.
Ledezma, G. A., Bejan, A., Errera, M. R., 1997, Constructal Tree Networks for Heat Transfer, Journal of Applied Physics, vol. 82, No. 1, pp. 89-100.
Miguel, A. F., Bejan, A., 2009, The Principle that Generates Dissimilar Patterns Inside Aggregates of Organisms, Physica A, vol. 388, pp. 727-731.
Ordonez, J. C., Bejan, A., Cherry, R. S., 2003, Designed Porous Media: Optimally Nonuniform Flow Structures Connecting One Point with More Points, International Journal of Thermal Science, vol. 42, pp. 857-870.

(Continued)

*Primary Examiner* — Suchin Parihar
(74) *Attorney, Agent, or Firm* — Nilay J. Choksi; Smith & Hopen, P.A.

(57) ABSTRACT

Dendritic cooling layers for printed circuit boards and method of fabrication thereof. The dendritic cooling layers may have non-intuitive dendritic structures that minimize peak temperature. The dendritic cooling layers may also be compatible with current PCB fabrication techniques. The dendritic cooling layers may have an adjustable tolerance to meet fabrication limits. The current invention also contemplates a method of generating a dendritic high conductivity path suitable for printed circuit boards. The methodology comprises the replacement of low conductivity materials with high conductivity materials such that the optimal ratio can be obtained to minimize heat flow resistance, while also maintaining lower costs of production.

20 Claims, 11 Drawing Sheets

(56) References Cited

OTHER PUBLICATIONS

Reis, A. H., 2008, Constructal View of the Scaling Laws of Street Networks—The Dynamics Behind Geometry, Physica A, vol. 387, pp. 617-622.

Rocha, L. A. O., Lorente, S., Bejan, A., 2009, Treeshaped Vascular Wall Designs for Localized Intense Cooling, International Journal of Heat and Mass Transfer, vol. 52, pp. 4535-4544.

Wechsatol, W., Ordonez, J.C., Kosaraju, S., 2006, Constructal Dendritic Geometry and the Existence of Asymmetry Bifurcation, Journal of Applied Physics, vol. 100, pp. 113514.

Wei, S., Chen, L., Sun, F., 2009, The Area-point Constructal Optimization for Discrete Variable Cross-section Conducting Path, Applied Energy, vol. 86, pp. 1111-1118.

Felczak, M., Wiecek, B., De Mey, G., 2009, Optimal Placement of Electronic Devices in Corced Convective Cooling Conditions, Microelectronics Reliability, vol. 49, pp. 1537-1545.

Bejan, A., 1997, Constructal-Theory Network of Conducting Paths for Cooling a Heat Generating Volume, International Journal of Heat and Mass Transfer, vol. 40, No. 4, pp. 799-816.

Jeevan, K., Quadir, G. A., Seetharamu, K. N., Azid, I. A., 2005, Thermal Management of Multi-chip Module and Printed Circuit Board Using FEM and Genetic Algorithms, Microelectronics International, vol. 22, No. 3, pp. 3-15.

Hengeveld, D. W., Braun, J. E., Groll, E. A, Williams, A. D., 2009, Optimal Placement of Electronic Components to Minimize Heat Flux Non-Uniformities, in: 50th AIAA/ASME/ASCE/AHS/ASC Structures, Structural Dynamics, and Materials Conference, pp. 1-14, Palm Springs, California, EUA.

Schneider et al., Control Volume Finite-Element Method for Heat Transfer and Fluid Flow Using Colocated Variables-1. Computational Procedure, 1987, Numerical Heat Transfer, vol. 11, pp. 363-390.

\* cited by examiner grid with $l = 0.01$ - $\tilde{T}_{max} = 0.0336$ (9900 elements)

grid with $l = 0.005$ - $\tilde{T}_{max} = 0.0308$ (39800 elements)

DENDRITIC COOLING LAYER GENERATOR AND METHOD OF FABRICATION

BACKGROUND OF THE INVENTION

1. Field of the Invention

This invention relates, generally, to cooling layers for printed circuit boards ("PCBs"). More particularly, it relates to dendritic cooling layers for multilayer PCBs and a method of generating a dendritic high conductivity path suitable for PCBs.

2. Description of the Prior Art

Several passive and active cooling systems are known in the art. However, conventional cooling systems are not effective when PCBs are operating at higher processing speeds.

Bejan volume (Bejan, A., 1997, Constructal-Theory Network of Conducting Paths for Cooling a Heat Generating Volume, International Journal of Heat and Mass Transfer, Vol. 40, No. 4, pp. 799-816) presented the Constructal Theory by solving an optimization problem for the cooling of a heat-generating surface. The proposed problem was "how to collect and channel to one point the heat generated volumetrically in a low conductivity volume of given size".

Based on Constructal Theory, several authors have solved similar problems for different geometries and assembly levels. These solutions are not restricted to heat conduction; they cover a wide variety of optimization problems where the flow resistance of a given entity can be minimized. The flowing entity can be energy in the form of heat (Wei, S., Chen, L., Sun, F., 2009, The Area-point Constructal Optimization for Discrete Variable Cross-section Conducting Path, Applied Energy, Vol. 86, pp. 1111-1118), fluid (Wechsatol, W., Ordonez, J. C., Kosaraju, S., 2006, Constructal Dendritic Geometry and the Existence of Asymmetry Bifurcation, Journal of Applied Physics, Vol. 100, pp. 113514; also Rocha, L. A. O., Lorente, S., Bejan, A., 2009, Treeshaped Vascular Wall Designs for Localized Intense Cooling, International Journal of Heat and Mass Transfer, Vol. 52, pp. 4535-4544), aggregates of organisms (Miguel, A. F., Bejan, A., 2009, The Principle that Generates Dissimilar Patterns Inside Aggregates of Organisms, Physica A, Vol. 388, pp. 727-731) or even people (Reis, A. H., 2008, Constructal View of the Scaling Laws of Street Networks—The Dynamics Behind Geometry, Physica A, Vol. 387, pp. 617-622).

According to Ledezma et al. (Ledezma, G. A., Bejan, A., Errera, M. R., 1997, Constructal Tree Networks for Heat Transfer, Journal of Applied Physics, Vol. 82, No. 1, pp. 89-100), the major difficulty with the optimization of higher order assembles is the increasing number of degrees of freedom to be optimized. As such, a solution is needed to resolve this difficulty.

There are similar algorithms in the literature as well. In the work of Errera et al. (Errera, M. R., Bejan, A., 1998, Deterministic Tree Networks for River Drainage Basin, Fractals, Vol. 6, No. 3, pp. 245-261), dendritic patterns formed by low-resistance channels in a river drainage basin were reproduced by a porous media model where the drainage channels were predicted using Constructal Theory. In their solution, Darcy's Law was used to formulate the problem and the computational domain was divided in small blocks, which were initialized with a base permeability $k_0$. The first step of the methodology was to determine the pressure field inside the computational domain and use it to estimate the pressure gradients. The process started with the replacement of the block that has the outlet port as one of its four sides. In a second step, the pressure gradient of all neighbors of this first block was calculated. If one or more of these gradients was higher than a predefined maximum value, the respective block was replaced by a higher permeability block. The procedure was then repeated for a defined number of steps. This algorithm produced tree-like forms similar to the patterns observed in coffee sediment on a concave surface (Errera, M. R., Bejan, A., 1998, Deterministic Tree Networks for River Drainage Basin, Fractals, Vol. 6, No. 3, pp. 245-261).

Ordonez et al. (Ordonez, J. C., Bejan, A., Cherry, R. S., 2003, Designed Porous Media: Optimally Nonuniform Flow Structures Connecting One Point with More Points, International Journal of Thermal Science, Vol. 42, pp. 857-870) studied a similar porous media problem. Two criteria, highest pressure and highest-pressure gradient, were used to choose the replacement sequence among elements that share at least one face with the high permeability region. The comparison of these two criteria led to the conclusion that better results can be obtained using the pressure gradient option.

A more recent work by Boichot et al. presented an algorithm, called automaton by the authors, that searches for an optimized solution for the problem of how to effectively cool a heat generating surface by arranging the configuration of high conductivity material inside a fixed area (Boichot, R., Luo, L., Fan, Y., 2009, Tree-network Structure Generation for Heat Conduction by Cellular Automaton, Energy Conversion and Management, Vol. 50, pp. 376-386). This algorithm discretized the domain in simple elements and used the temperature gradient to determine the location where high conductivity material should be positioned. In Boichot et al. (Boichot, R., Luo, L., Fan, Y., 2009, Tree-network Structure Generation for Heat Conduction by Cellular Automaton, Energy Conversion and Management, Vol. 50, pp. 376-386), all the high conductivity material was initially placed inside the computational domain, and at each solution step, elements having high conductivity exchanged their position with elements having low conductivity. Additionally, elements having high conductivity are more expensive than elements having low conductivity, and as such, this approach is limiting.

The search for the minimization of the maximum temperature in similar problems has been reported by Ledezma et al. (Ledezma, G. A., Bejan, A., Errera, M. R., 1997, Constructal Tree Networks for Heat Transfer, Journal of Applied Physics, Vol. 82, No. 1, pp. 89-100), Boichot et al. (Boichot, R., Luo, L., Fan, Y., 2009, Tree-network Structure Generation for Heat Conduction by Cellular Automaton, Energy Conversion and Management, Vol. 50, pp. 376-386), and Almogbel and Bejan (Almogbel, M., Bejan, A., 1999, Conduction Trees with Spacings at the Tips, International Journal of Heat and Mass Transfer, Vol. 42, pp. 3739-3756), but an optimum solution has yet to be found.

Accordingly, what is needed is an improved, more effective cooling system and cooling system generator for PCBs. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved, more effective and lower cost cooling system for PCBs is now met by a new, useful and nonobvious invention.

An embodiment of the current invention includes a dendritic cooling layer that has non-intuitive dendritic structures that minimize peak temperature. Another embodiment of the current invention includes a dendritic cooling layer that is compatible with current PCB fabrication techniques. Yet another embodiment of the current invention includes a dendritic cooling layer that has an adjustable tolerance to meet fabrication limits.

In an embodiment, the current invention comprises a method of minimizing heat flow resistance. The steps include discretizing a domain into a plurality of elements. The elements are formed of low conductivity materials. The domain contains at least one heat source. Next, heat is generated from the heat source within the domain. The heat is associated with temperature gradient fields among the elements. At least one boundary condition or threshold of temperature gradient field is established for the elements. The temperature gradient field of each element is then assessed, so that any elements falling above the threshold can be identified. These elements are then exchanged with high conductivity materials, thereby creating a modified configuration of the domain. The modified configuration is verified with the equation $$\frac{A_P}{A_0} < \Phi,$$

where $A_P$ is the area of elements formed of said high conductivity material, and $A_0$ is the area of elements formed of said low conductivity material. If the modified configuration is deemed true in view of the equation, the foregoing steps are performed. If the modified configuration is deemed false in view of the equation, then the modified configuration is deemed acceptable for minimizing maximum temperature of said domain, thereby minimizing heat flow resistance.

The method may further comprise the steps of assessing a temperature value of the elements, in addition to the temperature gradient field, and determining which elements should be exchanged if they fall above the threshold.

Each adjacent element within the domain may or may not share at least one edge with each other.

The step of assessing the temperature gradient fields may be accomplished by the following formulas:

$$\left.\frac{\partial T}{\partial x}\right|_{s,t} = \sum_{i=1}^{4} \left.\frac{\partial N_i}{\partial y}\right|_{s,t} T_i \text{ and } \left.\frac{\partial T}{\partial y}\right|_{s,t} = \sum_{i=1}^{4} \left.\frac{\partial N_i}{\partial y}\right|_{s,t} T_i,$$

where s and t define a local coordinate system within said domain, N is a shape function, and i is an index for said plurality of elements.

The step of exchanging the low conductivity elements that fell above the threshold with the high conductivity elements may be accomplished by the following formula:

$$\Theta = \max\left(\left|\frac{\partial T}{\partial x}\right|, \left|\frac{\partial T}{\partial y}\right|\right),$$

where $\Theta$ is a scalar variable, T is the temperature, and x and y are the Cartesian coordinates.

The method may further comprise the step of optimizing a structure of high conductivity material within the domain. The optimization can be guided by the following formula:

$$k\frac{\partial^2 T}{\partial x^2} + k\frac{\partial^2 T}{\partial y^2} + q''' = 0,$$

where T is the temperature, x and y are the Cartesian coordinates, and $q'''$ is volumetric heat generation, and k can assume values of $k_0$ or $k_p$, where $k_0$ denotes low conductivity and $k_p$ denotes high conductivity.

The step of exchanging the low conductivity elements that fell above the threshold with the high conductivity elements is performed symmetrically, such that two low conductivity elements selected from said one or more elements is replaced by two high conductivity elements.

The low conductivity elements that are exchanged with the high conductivity elements may be an even number, thereby producing a symmetric modified configuration of said domain.

The low conductivity elements that are exchanged with the high conductivity elements may be an odd number, thereby producing an asymmetric modified configuration of said domain.

There may be a direct relationship between the number of low conductivity elements that are exchanged with the high conductivity elements and the speed of achieving minimization of heat flow resistance.

The heat source may have a predetermined fixed location within the domain.

The method may further comprise the step of disposing high conductivity material within the heat source to create well-formed heat sinks.

The method may further comprise the steps of establishing a heat sink connecting the heat source with the ambient, and lining the heat sink with high conductivity material.

There may be disposed within the domain a plurality of heat sources.

In a separate embodiment, the current invention comprises a dendritic cooling system that minimizes heat flow resistance. The cooling system includes a base plate formed of low conductivity materials and high conductivity materials. The low conductivity materials generate heat, and the high conductivity materials transfer the heat to the ambient, wherein portions of the low and high conductivity materials overlap. The base plate has an elemental construct. The base plate further contains one or more heat sources to generate heat within the base plate. The base plate further contains one or more heat sinks used to dissipate the heat, wherein the heat sink has a predetermined fixed height.

The elemental construct may have a rectangular shape.

The heat source may contain at least a portion of the high conductivity materials, such that the heat sink becomes well formed.

The heat sink may be lined with the high conductivity materials as well.

There may be disposed within the domain a plurality of heat sources.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 1($b$) depicts a first constructal theory assembly as seen in the prior art.

FIG. 1($c$) depicts a second constructal theory assembly as seen in the prior art.

FIG. 1($d$) depicts a constructal theory network formed by higher-order assemblies as seen in the prior art.

FIG. 7($b$) depicts temperature for $N_c=24$, 25 and 26 ($k_p/k_0=30$, $\Phi=0.1$, $L=1$, $H=1$, $D=0.104881$ and $B=0.953463$).

FIG. 7($c$) depicts temperature gradient for $N_c=24$, 25 and 26 ($k_p/k_0=30$, $\Phi=0.1$, $L=1$, $H=1$, $D=0.104881$ and $B=0.953463$).

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 1:
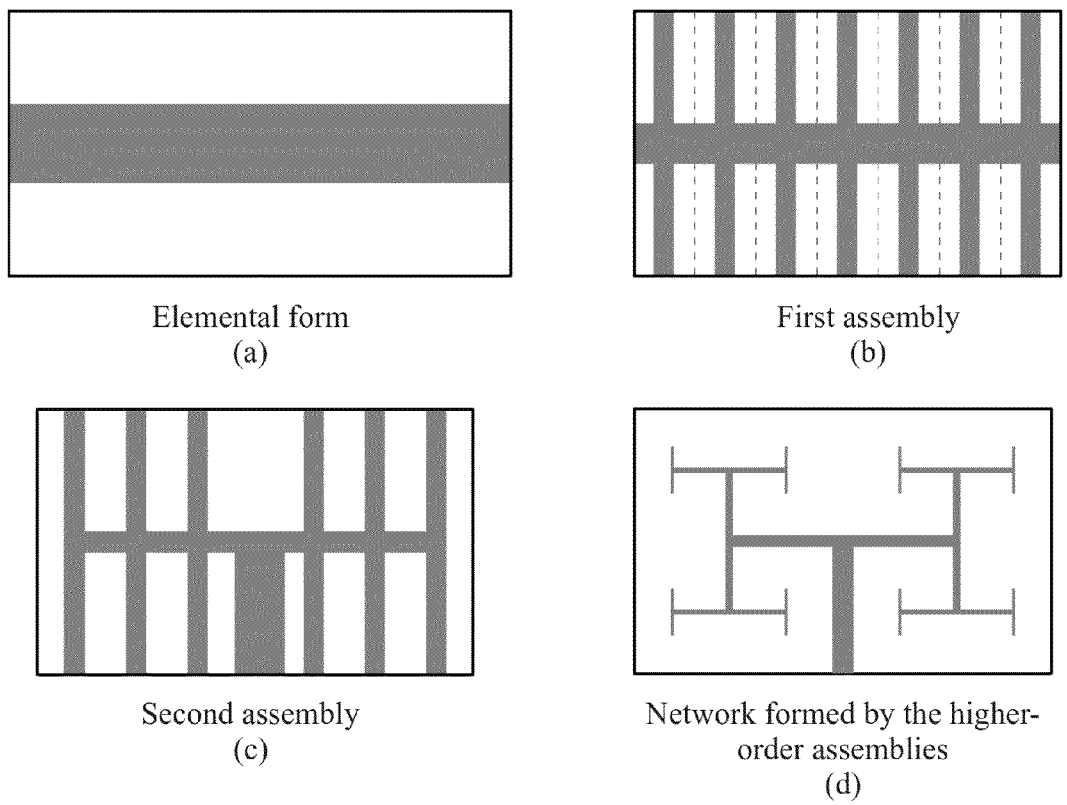
FIG. 1($a$) depicts a constructal theory assembly in elemental form as seen in the prior art.

In the current invention, the general idea is to develop a dendritic cooling layer generator for PCBs via a solution strategy and an optimization algorithm capable of searching for a geometry that leads to near optimal performance in a computationally efficient way for a heat conduction problem similar to that depicted in FIGS. 1($a$)-($d$). The current approach defined an elemental construct for which the geometry was optimized. The elemental construct had rectangular shape, as depicted in FIG. 1($a$), and consisted of two regions: (1) a region with a low conductivity material (indicated by the non-shaded region) and heat generation, and (2) a region with a high conductivity material (indicated by the shaded region) that was used to conduct the generated heat to the exterior through one end. The fraction of high conductivity material may be fixed. More complex forms (assemblies) were obtained by combining the optimized elemental form, as shown in FIGS. 1($b$), 1($c$) and 1($d$).

The current approach, following Constructal Theory, optimizes the cooling solution by minimization of the heat flow resistance. The domain is divided in small elements and the solution starts with all elements having low conductivity $k_0$. The temperature and temperature gradient fields are computed and the element or group of elements with the highest temperature gradient and low conductivity are exchanged by element(s) with high conductivity $k_p$. This procedure is repeated until all available high conductivity material ($k_p$) has been placed in the computational domain.

Both the highest temperature and highest temperature gradient were considered to select the elements that should have their thermal conductivity increased. Better results were obtained using the highest temperature gradient and only those are reported in the following sections.

The current algorithm differs from the algorithm disclosed in Boichot et al. in how the high conductivity material is placed inside the domain. In Boichot et al., all the high conductivity material was initially placed inside the computational domain, and at each solution step, elements with high conductivity exchanged their position with elements with low conductivity. This teaches away from the current invention, in which the computational domain has only low conductivity material ($k_0$). The high conductivity material is then added to the domain based on the calculated temperature gradient at each solution step. Boichot et al. failed to teach whether their automaton algorithm is capable of treating the problem in any similar way contemplated by the current invention. Another difference between the current methodology and that of Boichot et al. is that Boichot et al. requires the exchanged elements to be connected by at least one edge with the high conductivity tree (Boichot, R., Luo, L., Fan, Y., 2009, Tree-network Structure Generation for Heat Conduction by Cellular Automaton, Energy Conversion and Management, Vol. 50, pp. 376-386). This also teaches away from the present methodology, which allows one element to be placed in isolation (i.e., new elements added to the computational domain do not need to share edges with other high conductivity elements). The methods differ also in the numerical approach used to compute the temperature gradient.

Problems Presented

The problem to be solved is comprised on a solid 2D plate built with two different materials: a low conductivity and a high conductivity material. Heat sources are present inside the plate, and one or more heat sinks are used to dissipate the heat generated to the ambient. The maximum temperature is monitored and the main goal of the optimization problem is to determine the best possible configuration (location) for the high and low conductivity materials in the plate such that the maximum temperature can be minimized. The total amount of available high conductivity material is constrained. Due to the computational challenge of trying all possible configurations, especially in large domains, an approach similar to Ordonez et al. can be followed to search for a nearly optimal configuration (see Ordonez, J. C., Bejan, A., Cherry, R. S., 2003, Designed Porous Media: Optimally Nonuniform Flow Structures Connecting One Point with More Points, International Journal of Thermal Science, Vol. 42, pp. 857-870).

Figure 2:
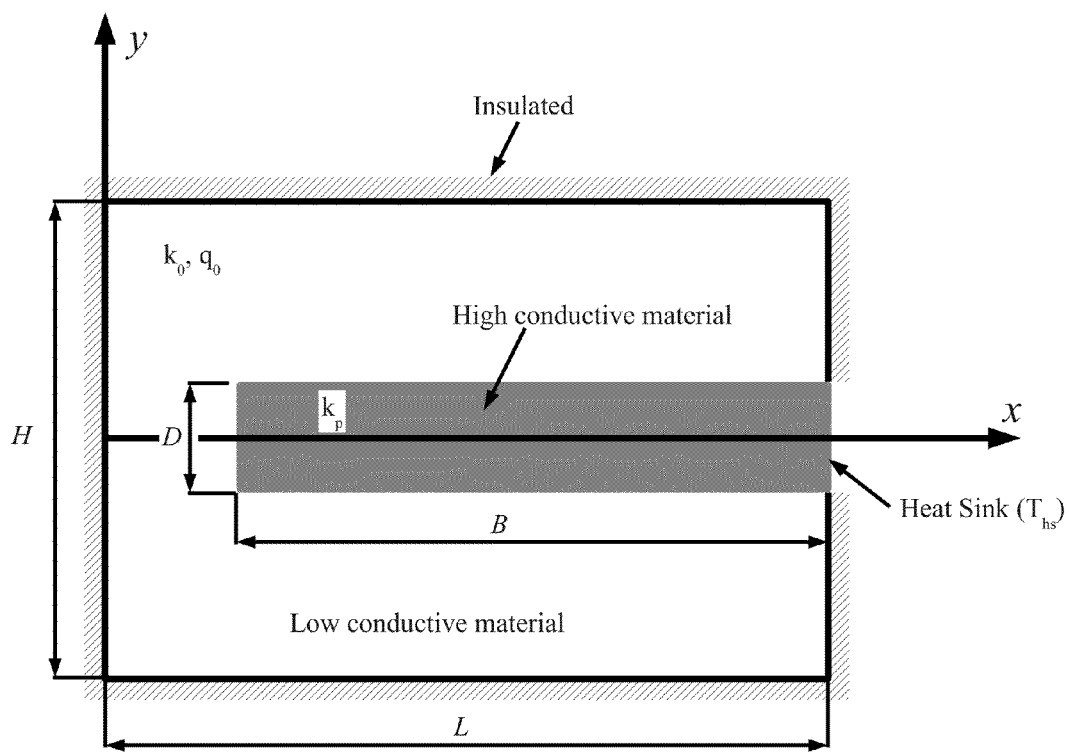
FIG. 2 depicts conventional cooling systems and problems associated thereof.

FIG. 2 shows one possible geometric configuration for the problem, being a rectangular plate with a single heat sink. The internal shaded region indicates the high conductivity material and the non-shaded (i.e., white, empty) region indicates the low conductivity material. In this particular example, the heat generation is applied only in the regions with low conductivity material. The dimensions of the plate may vary, though for the optimization problem, the plate area is kept constant and equal to H×L.

The problem presented in FIG. 2 was first proposed by Bejan as one of the applications of Constructal Theory (Bejan, A., 1997, Constructal-Theory Network of Conducting Paths for Cooling a Heat Generating Volume, International Journal of Heat and Mass Transfer, Vol. 40, No. 4, pp. 799-816). The general goal of the current invention is to determine the best shape (H/L) and structure of the high conductivity material placed within the low conductivity material in such a way that the heat removed through the heat sink is maximized.

The governing equation for the problem illustrated in FIG. 2 is given by $$k_0 \frac{\partial^2 T}{\partial x^2} + k_0 \frac{\partial^2 T}{\partial y^2} + \frac{q_0}{(A_0 - A_P)W} = 0 \quad (1)$$

for the low conductivity material regions, and $$k_P \frac{\partial^2 T}{\partial x^2} + k_P \frac{\partial^2 T}{\partial y^2} = 0 \quad (2)$$

for the high conductivity material regions. In Equations (1) and (2), T is the temperature [K], x and y are the Cartesian coordinates [m] and $q_0$ is the heat generation rate [W].

In order to compare the present solution with previous work (see Ledezma, G. A., Bejan, A., Errera, M. R., 1997, Constructal Tree Networks for Heat Transfer, Journal of Applied Physics, Vol. 82, No. 1, pp. 89-100; also see Almogbel, M., Bejan, A., 1999, Conduction Trees with Spacings at the Tips, International Journal of Heat and Mass Transfer, Vol. 42, pp. 3739-3756), Equation (1) must be rewritten in a nondimensional form. Defining the following nondimensional variables $$(\tilde{x}, \tilde{y}) = \frac{(x, y)}{A_0^{(\frac{1}{2})}}, \; \tilde{T} = \frac{T - T_{hs}}{q''' \frac{A_0}{k_0}}, \; \Phi = \frac{A_P}{A_0} \quad (3)$$

where A is the area [m$^2$], $\Phi$ is the ratio between the areas of the high and low conductivity material and the subscripts 0, P, and hs indicate low conductivity material, high conductivity material, and heat sink, respectively.

A constant heat generation rate is present only in the low conductivity material in FIG. 2. The relationship between this heat ($q_0$) and the volumetric heat generation ($q'''$) that appears in Equation (3) is given by $$q''' \frac{q_0}{A_0} = \frac{q_0}{HLW} \quad (4)$$

where H is the height, L the length and W=1, the thickness of the computational domain.

Combining Equations (1-4), the nondimensional governing equation for the low conductivity material is given by $$\frac{\partial^2 \tilde{T}}{\partial \tilde{x}^2} + \frac{\partial^2 \tilde{T}}{\partial \tilde{y}^2} + \frac{1}{1 - \phi_0} = 0. \quad (5)$$

The nondimensional governing equation for the high conductivity material is given by $$\frac{\partial^2 \tilde{T}}{\partial \tilde{x}^2} + \frac{\partial^2 \tilde{T}}{\partial \tilde{y}^2} = 0. \quad (6)$$

Equations (5) and (6) can be applied in a nondimensional computational domain defined by the variables $$(\tilde{H}, \tilde{L}, \tilde{D}) = \frac{(H, L, D)}{A_0^{\frac{1}{2}}}, \quad (7)$$

which satisfy the nondimensional constant area constraint given by $$\tilde{H}\tilde{L}=1. \quad (8)$$

Sequential Stages of a Novel Algorithm

In a sequential form, the present algorithm can be described in the following stages. Stage 1 is to discretize the computational domain in small elements. Stage 2 is to assign the low conductivity ($k_0$) to the whole computational domain. Stage 3 is to set boundary conditions and internal heat generation. Stage 4 is to calculate the temperature gradients. Stage 5 is to determine, among regions with low conductivity material, the location of the highest gradients ($N_c$ of them). Stage 6 is to set the $N_c$ highest temperature gradient elements with high conductivity material. Stage 7 is to check if $A_p/A_0 < \Phi$; if true, then return to stage 4, and if false, then end.

Stages 1-3 define the geometry, grid and boundary conditions. The grid refinement necessary to solve the problem is associated not only with the numerical solution of Equations (5) and (6), but also with the search for the regions where the high conductivity material should be placed. Since the high conductivity material is gradually placed on the regions with higher temperature gradients, it is expected that more refined grids will lead to solutions closer to the optimal one (i.e., the maximum temperature approaches its minimal value). The boundary conditions are set as described in FIG. 2.

In Stage 4, temperature gradients are evaluated. The temperature profile inside the computational domain is obtained with a Control Volume Finite Element method (Souza, J. A., 2000, Implementacao de um metodo de volumes finitos com sistema de coordenadas locais para a solucao acoplada das equacoes de Navier-Stokes, Master's Dissertation, Universidade Federal de Santa Catarina, Florianopolis/SC, Brasil; also Schneider, G. E., Raw, M. J., 1987, Control volume finite element procedure for heat transfer and fluid flow using collocated variables: 1. Computational procedure, Numerical Heat Transfer, Vol. 11, No. 4, pp. 363-390), hereafter referred to as CVFES (Control Volume Finite Element Solver).

Figure 3:
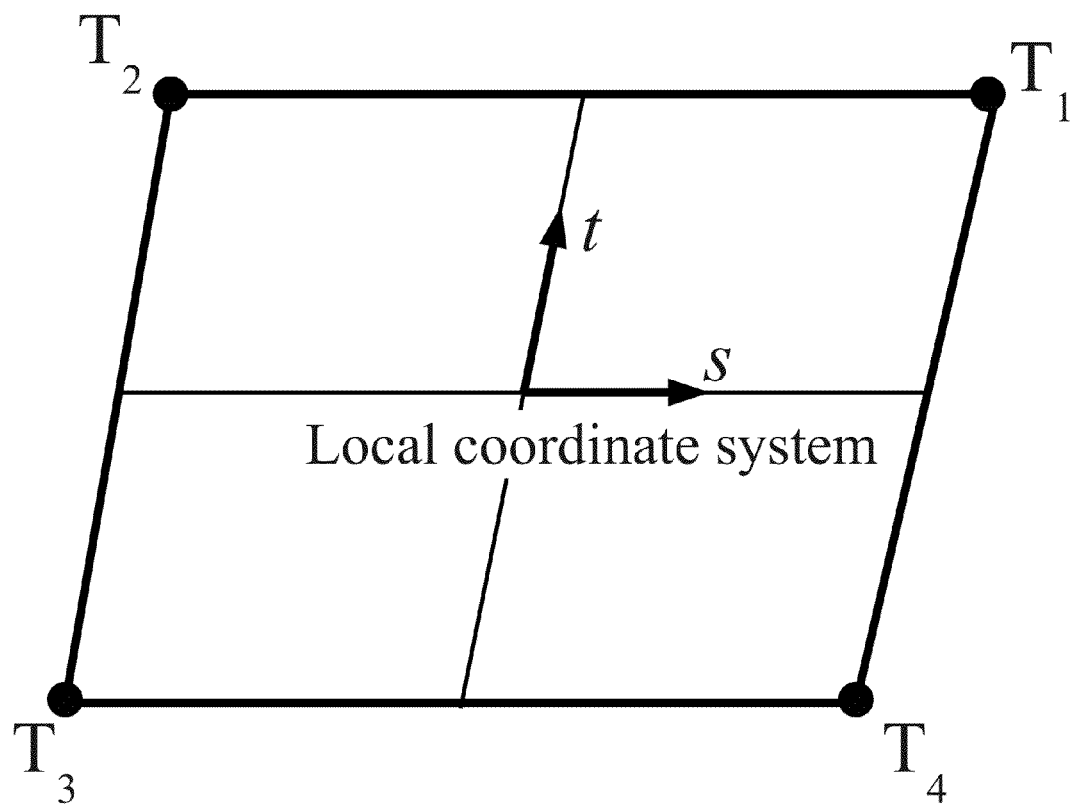
FIG. 3 depicts a grid element with temperature gradient calculation.

FIG. 3 shows a grid element, built with four points. A local coordinate system (s, t) is used to interpolate the temperature and calculate the pressure gradients inside the element. The shape functions for this element are $$\begin{cases} N_1 = (s, t) = 0.25(1+s)(1+t) \\ N_2 = (s, t) = 0.25(1+s)(1+t) \\ N_3 = (s, t) = 0.25(1+s)(1+t) \\ N_4 = (s, t) = 0.25(1+s)(1+t). \end{cases} \quad (9)$$

Knowing the four node temperatures $T_1$, $T_2$, $T_3$ and $T_4$, the temperature at a specific position (s, t) inside the element can be approximated as $$T(s,t) = \Sigma_{i=1}^{4} N_i(s,t) T_i, \quad (10)$$

and the temperature gradients in the x and y directions can be computed as $$\left.\frac{\partial T}{\partial x}\right|_{s,t} = \sum_{i=1}^{4} \left.\frac{\partial N_i}{\partial y}\right|_{s,t} T_i \quad (11)$$

and $$\left.\frac{\partial T}{\partial y}\right|_{s,t} = \sum_{i=1}^{4} \left.\frac{\partial N_i}{\partial y}\right|_{s,t} T_i, \quad (12)$$

where s and t define the local coordinate system, N is the shape function, and i is the index for the element nodes.

A further description of the variables and derivatives interpolations inside the element can be found in Souza (Souza, J. A., 2000, Implementacao de um metodo de volumes finitos com sistema de coordenadas locals para a solucao acoplada das equacoes de Navier-Stokes, Master's Dissertation, Universidade Federal de Santa Catarina, Florianopolis/SC, Brasil), Schneider and Raw (Schneider, G. E., Raw, M. J., 1987, Control volume finite element procedure for heat transfer and fluid flow using collocated variables: 1. Computational procedure, Numerical Heat Transfer, Vol. 11, No. 4, pp. 363-390) and Souza and Maliska (Souza, J. A., Maliska, C. R., 2000, Analysis of a Volume Based Finite Element Methodology in View of the Interpolation Function Employed and Coupling Characteristics, in: ENCIT 2000—8th Brazilian Conference on Thermal Engineering and Sciences, Porto Alegre/RS, Brasil).

Additionally, a positive scalar derivative field can be calculated. Since, for each element, two derivatives are computed (in the x and y directions) and both may assume a positive or a negative value, a new scalar variable $\Theta$ can be defined as $$\Theta = \max\left(\left|\frac{\partial T}{\partial x}\right|, \left|\frac{\partial T}{\partial y}\right|\right) \quad (13)$$

In Stage 5, the scalar field defined by Equation (13) will guide the sequential procedure of replacing the low conductivity elements with the high conductivity ones.

Figure 4:
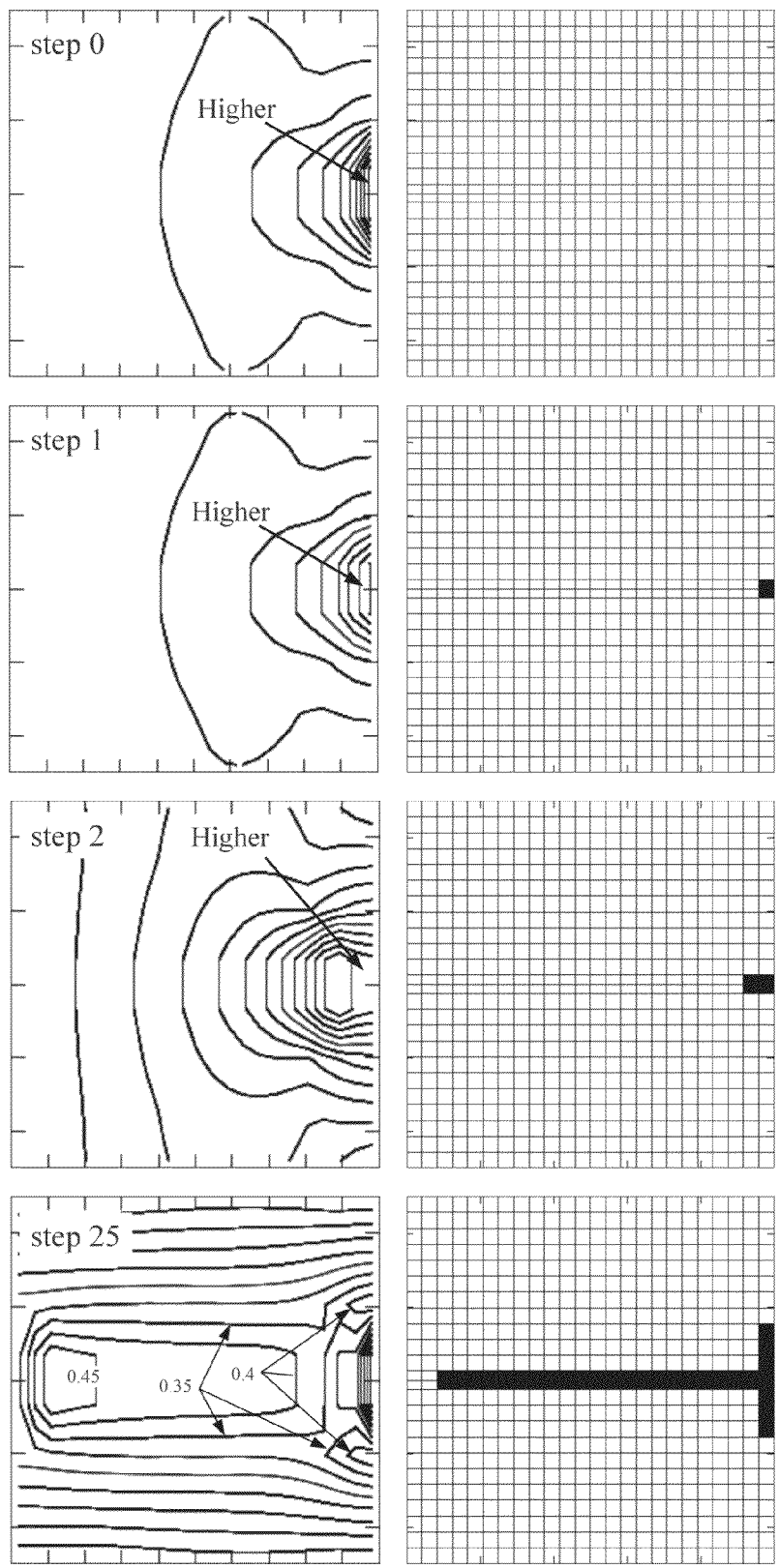
FIG. 4 depicts a sequence of placing high conductivity material within the domain. The left column depicts the temperature gradients ($\Theta$), and the right column depicts the position of the high conductivity material ($N_c=2$, 1056 elements, $k_p/k_0=10$).

The sequential substitution procedure as illustrated in FIG. 4. Step 0 represents the first temperature field calculation. At this moment, all elements have low conductivity ($k_0$). In step 1, based on the temperature gradient calculated in step 0, the two ($N_c$=2) elements with the highest P are replaced by elements with high conductivity (stage 6). The procedure is repeated until the number of high conductivity elements is such that $A_p/A_0 > \Phi$ (stage 7). Steps 2 and 25 are also shown in FIG. 4.

Finite Volume Solver Validation

Equations (5) and (6) were solved using a CVFES method (Schneider, G. E., Raw, M. J., 1987, Control volume finite element procedure for heat transfer and fluid flow using collocated variables: 1. Computational procedure, Numerical Heat Transfer, Vol. 11, No. 4, pp. 363-390; Souza, J. A., Maliska, C. R., 2000, Analysis of a Volume Based Finite Element Methodology in View of the Interpolation Function Employed and Coupling Characteristics, in: ENCIT 2000—8th Brazilian Conference on Thermal Engineering and Sciences, Porto Alegre/RS, Brasil). The validity of the CVFES solution was tested by comparing its solution with the solution obtained with a Finite Element solver in a similar problem (Almogbel, M., Bejan, A., 1999, Conduction Trees with Spacings at the Tips, International Journal of Heat and Mass Transfer, Vol. 42, pp. 3739-3756), as depicted in FIG. 2. All dimensions in FIG. 2 are presented in a nondimensional form and the computational domain discretization was performed with rectangular elements. The solution grid independence was tested by assuming square elements with side length l=0.005, 0.01 and 0.015. The grid is built mainly of square elements of edge l. However, since more than one sub-domain exists, the elements are not perfect squares in some instances.

The comparison with the problem described in Almogbel and Bejan (Almogbel, M., Bejan, A., 1999, Conduction Trees with Spacings at the Tips, International Journal of Heat and Mass Transfer, Vol. 42, pp. 3739-3756) showed a difference between the two solutions (for the maximum temperature inside the geometry) smaller than 0.2% when the grids with l=0.01 and l=0.005 were used. Thus, the grid with l=0.01 (approximately 10000 elements) was selected for the computation of the temperature field. Table 1 illustrates a comparison between the CVFES solution and the FE solution (see Almogbel, M., Bejan, A., 1999, Conduction Trees with Spacings at the Tips, International Journal of Heat and Mass Transfer, Vol. 42, pp. 3739-3756) for a problem with $\Phi$=0.1, H/L=1 (square) and D/B=0.15. The grid with l=0.01 was used in this comparison.

Algorithm Validation

An embodiment of the current algorithm taught herein is validated by comparing the results obtained for the problem, shown in FIG. 2, and the solutions presented in Ledezma et al. (Ledezma, G. A., Bejan, A., Errera, M. R., 1997, Constructal Tree Networks for Heat Transfer, Journal of Applied Physics, Vol. 82, No. 1, pp. 89-100) and Almogbel and Bejan (Almogbel, M., Bejan, A., 1999, Conduction Trees with Spacings at the Tips, International Journal of Heat and Mass Transfer, Vol. 42, pp. 3739-3756) for the elemental, first and second constructs. The main goal is not to reproduce the results obtained by Ledezma et al. (1997) and Almogbel and Bejan (1999), but to show that the present algorithm is capable of generating optimized geometries following a sequential procedure.

Table 1 depicts a comparison between the highest temperature results calculated with the CVFES and the FE (Almogbel, M., Bejan, A., 1999, Conduction Trees with Spacings at the Tips, International Journal of Heat and Mass Transfer, Vol. 42, pp. 3739-3756) ($\Phi = 0.1$, H/L = 1 (square) and D/B = 0.15).

| $k_p/k_o$ | CVFES | FE | difference (%)* |
|---|---|---|---|
| 1000 | 0.128465 | 0.128236 | 0.18 |
| 300 | 0.136147 | 0.135924 | 0.16 |
| 100 | 0.157437 | 0.157219 | 0.14 |
| 30 | 0.225056 | 0.224812 | 0.11 |
| 10 | 0.375526 | 0.374893 | 0.17 |

*difference = 100 * (CVFES − FE)/CVFES

The problem considered is a square geometry (H/L=1), with $\Phi=0.1$ and $k_p/k_0=300$. From Almogbel and Bejan (Almogbel, M., Bejan, A., 1999, Conduction Trees with Spacings at the Tips, International Journal of Heat and Mass Transfer, Vol. 42, pp. 3739-3756), it is known that the optimized value of D/B for this problem is 0.11. Combining this information, it is possible to set a system of equations such as $$\begin{cases} \dfrac{\tilde{H}}{\tilde{L}} = 1 \\ \tilde{H}\tilde{L} = 1 \\ \dfrac{\tilde{D}}{\tilde{B}} = 0.11 \\ \phi = \dfrac{\tilde{D}\tilde{B}}{\tilde{H}\tilde{L}} = 0.1. \end{cases} \quad (14)$$

The solution of Equation (14) results in L=1, H=1, D=0.104881 and B=0.953463. It is noted that B is not used in the present solution.

Table 2 presents a comparison between the current solution and the prior art's optimized solutions of the elemental, first and second constructs. The current solution (i.e., the square geometry with fixed heat sink height (D=0.104881)) is compared with four different solutions obtained by Ledezma et al. (Ledezma, G. A., Bejan, A., Errera, M. R., 1997, Constructal Tree Networks for Heat Transfer, Journal of Applied Physics, Vol. 82, No. 1, pp. 89-100) and Almogbel and Bejan (Almogbel, M., Bejan, A., 1999, Conduction Trees with Spacings at the Tips, International Journal of Heat and Mass Transfer, Vol. 42, pp. 3739-3756). The first column in Table 2 indicates the minimum temperature found an embodiment of the current approach using two different meshes (l=0.01 and l=0.005). The second column contains the construct level, and the third and fourth columns correspond to results reported in Ledezma et al. (1997) and Almogbel and Bejan (1999). The first row contains the optimized solution for a square geometry and the elemental construct. This is the simplest possible configuration and has the highest minimum temperature among the cases being compared. The second row shows that only changing the external shape (H/L) leads to a lower maximum temperature in the prior art. Increasing the complexity of the system (i.e., increasing the construct level) leads to lower maximum temperatures inside the computational domain. This can be seen in the third and fourth rows of Table 2, with the first and second constructs, respectively.

In Table 2, it can also be seen that increasing the complexity of the problem, either by refining the grid in the current solution or by increasing the construct level in the prior art, leads to approximately the same maximum (nondimensional) temperature of 0.03.

Table 2 depicts validation of an embodiment of the present invention ($k_p/k_0 = 300, \Phi = 0.1$).

| Current invention | Prior Art | | |
|---|---|---|---|
| $T_{min}$ | Construct | $T_{min}$ | Reference |
| 0.0336426 (l = 0.01) | 0 | 0.125* | Almogbel and Bejan (1999) Table 3 |
| 0.0308341 (l = 0.005) | | | |
| | 0 | ~0.08** | Ledezma et al. (1997) FIG. 4 |
| | 1 | 0.031** | Ledezma et al. (1997) Table 2 |
| | 2 | 0.0312** | Ledezma et al. (1997) Page 99 |

*square domain $\left(\dfrac{\tilde{H}}{\tilde{L}} = 1 \text{ with optimized } \dfrac{\tilde{D}}{\tilde{B}} = 0.11\right)$

**optimized H/L

Figure 5:
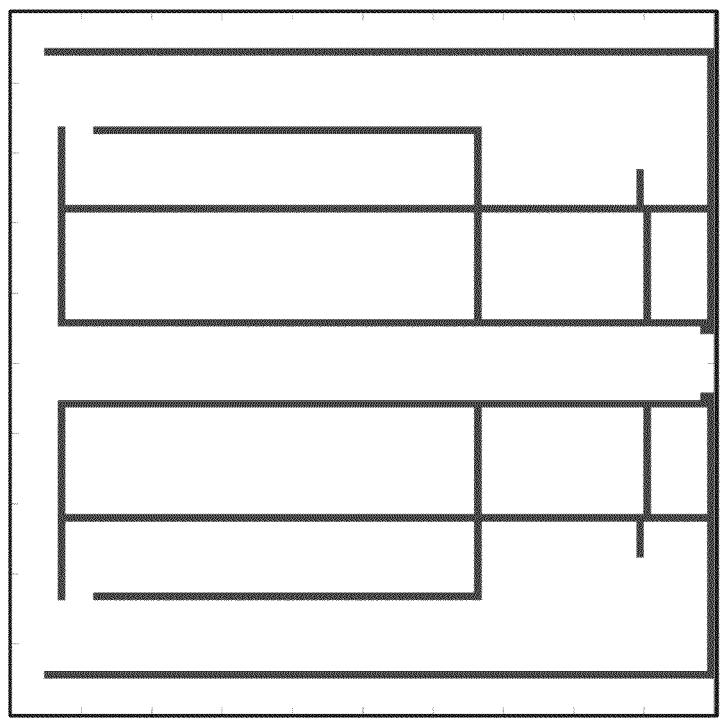
FIG. 5 depicts the geometry obtained for the validation solution ($N_c=2$, $k_p/k_0=300$, $\Phi=0.1$, $L=1$, $D=0.104881$ and $B=0.953463$).
Figure 5:
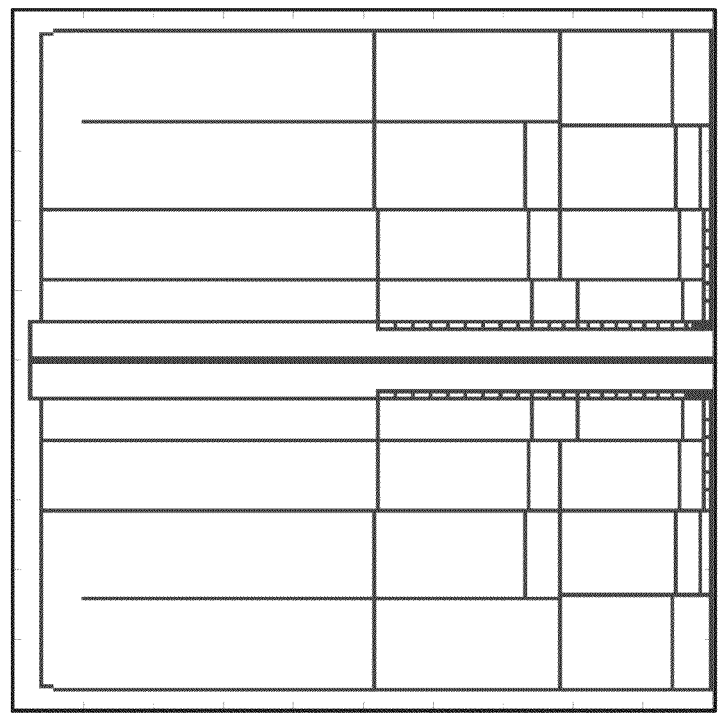

FIG. 5 shows the high conductivity material distribution inside the computational domain. The symmetry is obtained automatically when $N_c=2$ is selected. This means that at every simulation step, two low conductivity elements will be replaced by two high conductivity elements. There is no need to impose any kind of symmetry verification in the code, though this imposition is contemplated by the current invention. As predicted by the Constructal Theory, heat channels form naturally to facilitate the overall system cooling, depicted in FIG. 5. No imposition has been made to the algorithm to force the new high conductivity elements be placed next to an already existent high conductivity element, though this imposition is contemplated by the current invention.

Influence of $K_p/K_0$ and $N_c$ on the Solution

Figure 6:
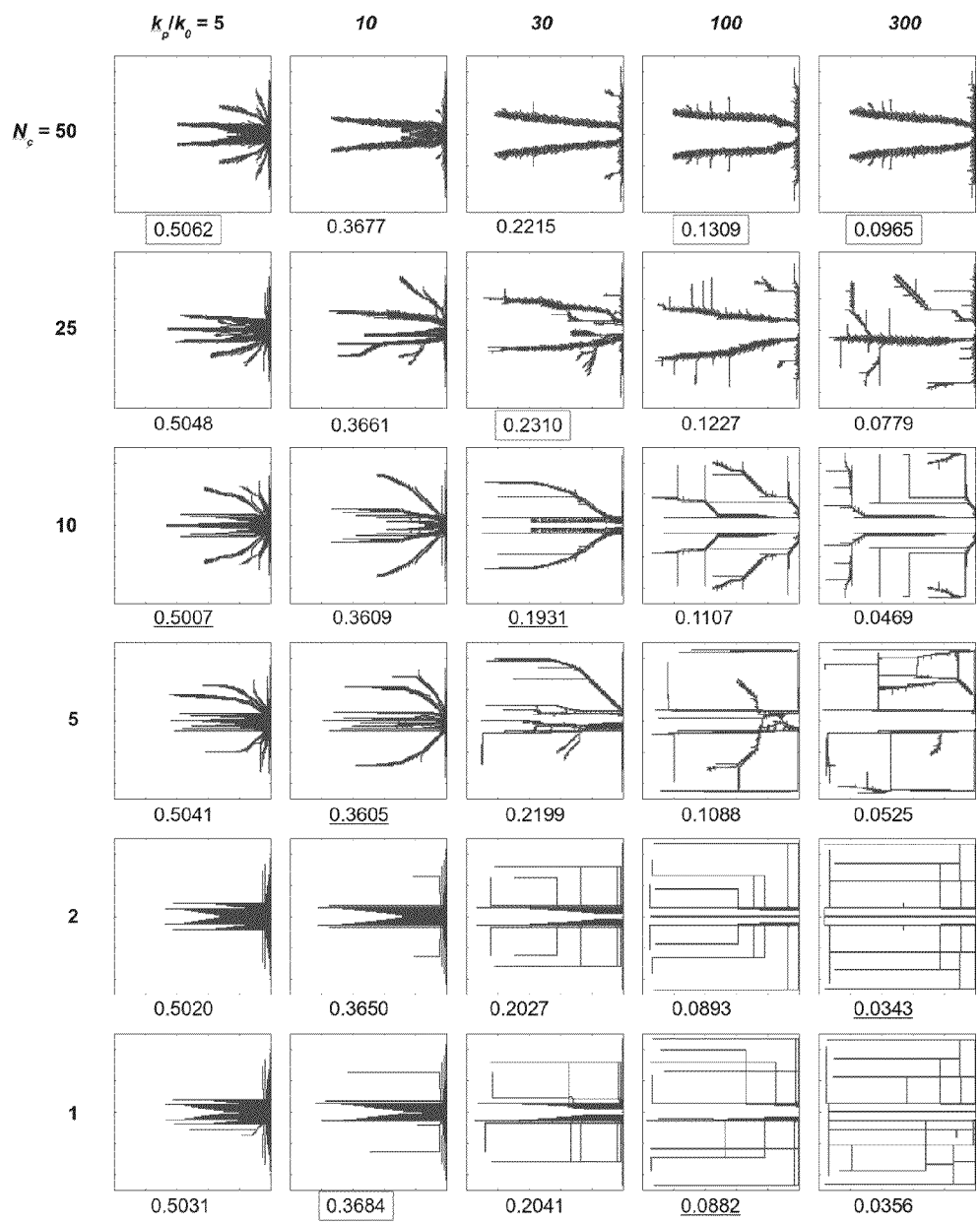
FIG. 6 depicts an analysis of the influence of $N_c$ and $k_p/k_0$ parameters on the tree-like patterns formation ($\Phi=0.1$, grid with 19880 element).

The shape of the high conductivity insert that results with the present algorithm depends on both the ratio $k_p/k_0$ and the number of elements with low conductivity material replaced (in every solution step) by elements with high conductivity material, $N_c$. FIG. 6 illustrates a map with the solution (maximum temperature) for $k_p/k_0=5, 10, 30, 100$ and 300 and $N_c=1, 2, 5, 10, 20$ and 50. In each column, the highest and lowest minimum temperatures are highlighted in FIG. 6 with a border box and underlined text, respectively.

In FIG. 6, it can be observed that tree-like geometries, like those predicted by Constructal Theory, are formed naturally (i.e., as discussed, the elements are not forced to be adjacent). Also in FIG. 6, it can be noticed that an even $N_c$ produces a symmetric structure, while an odd $N_c$ will produce an asymmetric structure.

An unexpected result in FIG. 6 is that the best solution among the cases considered is not associated with the lowest $N_c$. The time needed to solve the problem is inversely proportional to $N_c$. In this way, if a high $N_c$ is used, it is possible to obtain a rapid solution that is sufficiently close to the optimal one.

Figure 7:
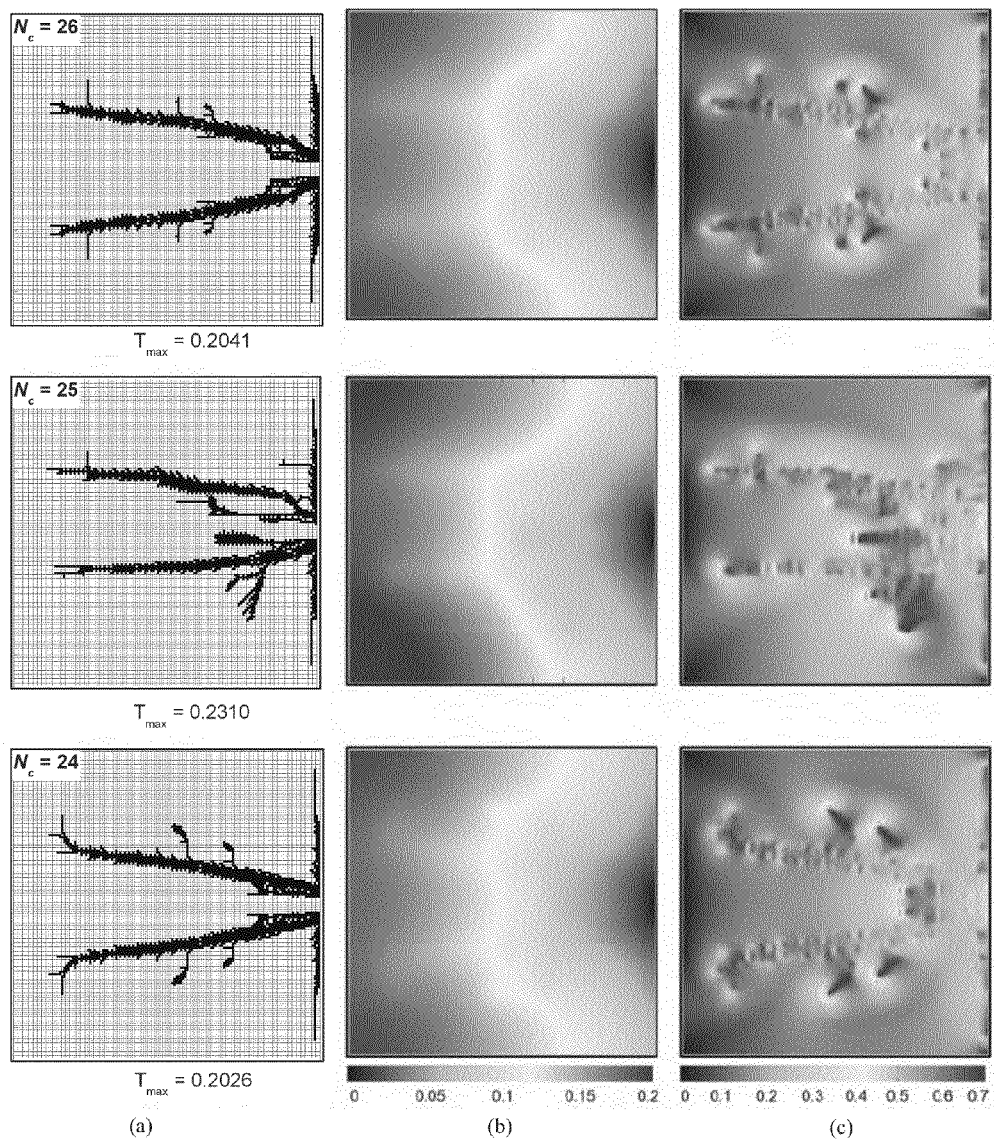
FIG. 7($a$) depicts pattern formation for $N_c=24$, 25 and 26 ($k_p/k_0=30$, $\Phi=0.1$, $L=1$, $H=1$, $D=0.104881$ and $B=0.953463$).

FIGS. 7(a)-(c) illustrate the resulting high conductivity patterns (FIG. 7(a)), the temperature field (FIG. 7(b)), and the temperature gradient (FIG. 7(c)) for three consecutive values of $N_c$ ($N_c$=24, 25 and 26) and a thermal conductivity ratio $k_p/k_0$=30. Tree-like structures are observed for all three cases. It is also depicted that for the cases considered, the peak temperature does not monotonically decrease with the decrease of $N_c$.

Example

Nonuniform Heat Generation

The cooling of a rectangular plate with one or more heat sources is considered. The problem is to determine the positioning of the high conductivity material that will produce the minimum maximum temperature. The problem differs from the ones previously described by the fact that the heat generation is no longer uniform through the low conductivity domain but localized in given location(s). Both high and low conductivity materials can be placed in these regions.

The problem of how to assemble a number of heat sources on a plate of given area and ensure that the maximum temperature is kept below an acceptable value can be treated in at least two ways. The first and more common method, as described in Hengeveld et al. (Hengeveld, D. W., Braun, J. E., Groll, E. A, Williams, A. D., 2009, Optimal Placement of Electronic Components to Minimize Heat Flux Non-Uniformities, in: 50$^{th}$ AIAA/ASME/ASCE/AHS/ASC Structures, Structural Dynamics, and Materials Conference, pp. 1-14, Palm Springs, Calif., EUA; also Jeevan, K., Quadir, G. A., Seetharamu, K. N., Azid, I. A., 2005, Thermal Management of Multi-chip Module and Printed Circuit Board Using FEM and Genetic Algorithms, Microelectronics International, Vol. 22, No. 3, pp. 3-15; also Felczak, M., Wiecek, B., De Mey, G., 2009, Optimal Placement of Electronic Devices in Corced Convective Cooling Conditions, Microelectronics Reliability, Vol. 49, pp. 1537-1545), is to determine the best location for these heat sources inside the available area in order to minimize the maximum temperature. The second method occurs when the heat source locations have a predetermined position and cannot be moved. In this case, it is necessary to find other ways to minimize the maximum temperature. Possible solutions are to increase the cooling rate with the inclusion of fins or a fan, or to exchange the plate material with a material with higher conductivity. This second methodology of problems is analyzed herein. The idea is not to exchange the whole plate with one of higher conductivity material, but to optimize the use of this high conductivity material (i.e., higher cost) by adding just the needed quantity of it in a low conductivity (i.e., lower cost) material plate.

One Source Problem

Figure 8:
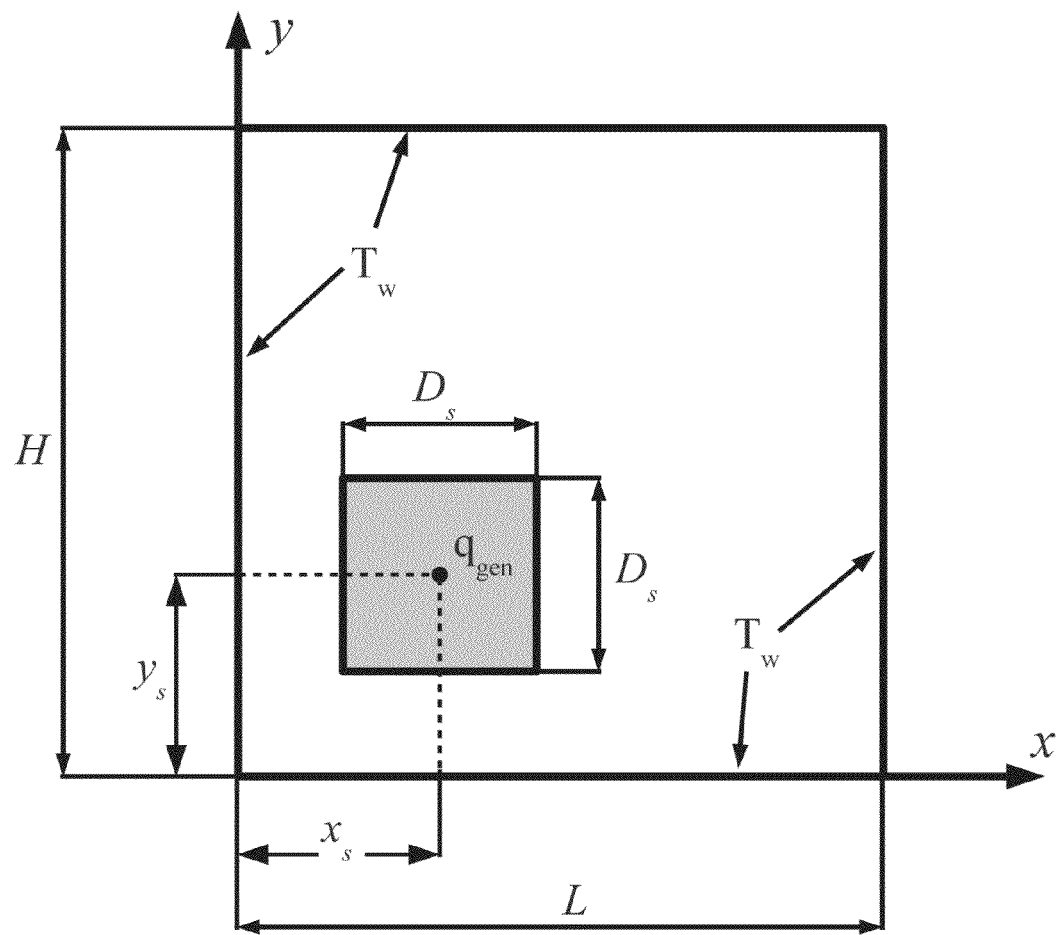
FIG. 8 is an illustration of the one source problem.

First, a one source problem (i.e., one heat source), as depicted in FIG. 8, is analyzed. The computational domain is a rectangular area with dimensions L and H with a rectangular heat source (with side length $D_s$). The heat source center point is located at ($x_s$, $y_s$). The total heat being generated within the source is constant and equal to $q_{gen}$.

The constant total area constraint is applied (LH=$A_0$). The problem is also solved in a nondimensional form. Additional nondimensional variable needed are:

$$\tilde{D}_s = \frac{D_s}{A_0^{1/2}}, \phi_s = \frac{A_s}{A_0} = \frac{\tilde{D}_s^2}{\tilde{H}\tilde{L}}, \tilde{x}, \tilde{y} = \frac{x, y}{A_0^{1/2}} \quad (15)$$

In a general form, Equation (1) can be rewritten as $$k\frac{\partial^2 T}{\partial x^2} + k\frac{\partial^2 T}{\partial y^2} + q''' = 0 \quad (16)$$

where k can assume values of $k_0$ or $k_p$.

The volumetric heat generation term q''' is defined as $$q''' = \frac{q_{gen}}{A_s W} \quad (17)$$

where W is the plate thickness and equal to 1 m.

Combining Equations (15), (16) and (17), the resulting heat conduction equation for the regions with heat generation is $$\frac{\partial^2 \tilde{T}}{\partial \tilde{x}^2} + \frac{\partial^2 \tilde{T}}{\partial \tilde{y}^2} + \frac{k_0}{k} = 0. \quad (18)$$

The heat conduction equation for regions without heat generation is $$\frac{\partial^2 \tilde{T}}{\partial \tilde{x}^2} + \frac{\partial^2 \tilde{T}}{\partial \tilde{y}^2} = 0. \quad (19)$$

All boundaries are kept at $\tilde{T}_w$=0.

Figure 9:
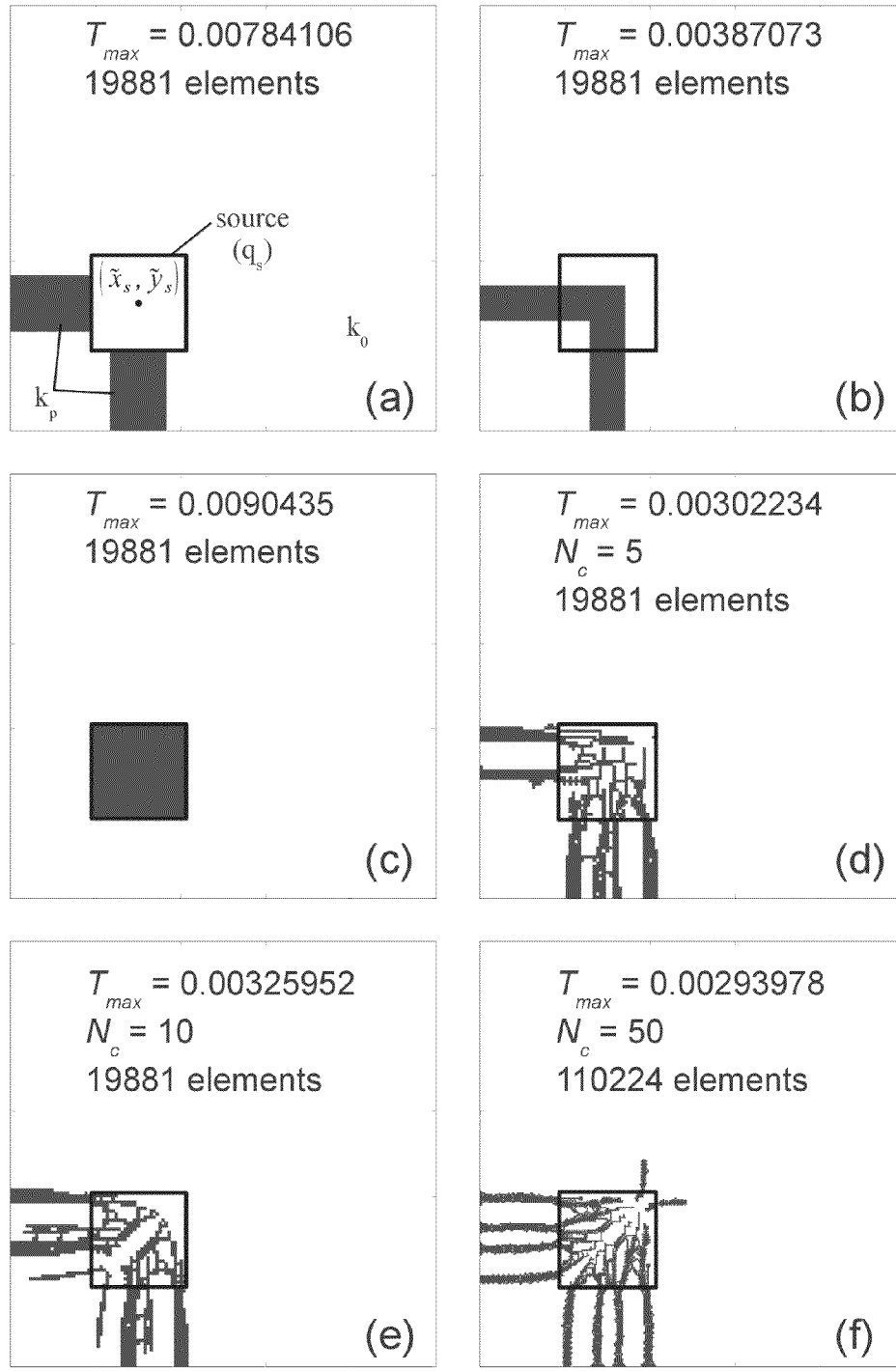
FIG. 9 is an illustration for the solution of the one source problem from FIG. 8.

FIGS. 9(a)-(f) illustrates different solutions to the one source problem. FIGS. 9(a)-(c) illustrate three basic solutions found in the prior art, to be compared with the current algorithm. The heat generation (i.e., source) is uniformly distributed in a square area of central coordinates $x_s$=0.3 and $y_s$=0.3, and the computational domain is also square (H=L).

In FIG. 9(a), the heat source is connected by two "heat channels" with the two closest domain walls at temperature $T_w$=0. When compared with results presented in FIG. 9(d), it is clear that a lower maximum temperature can be obtained with the same amount of high conductivity material. Analysis of FIG. 9(d) suggests that part of the high conductivity material should be placed inside the heat source area. Thus, a second configuration, depicted in FIG. 9b, was tested, and the maximum temperature obtained with this second configuration was reduced to 0.00387073. The extreme is to place all high conductivity material inside the heat source region, as depicted in FIG. 9(c). However, this configuration is not optimal because there are no heat channels (i.e., heat sink) connecting the heat generation with the domain walls.

In FIG. 9(e), the same analysis of FIG. 9(d) is performed for $N_c$=10 and 50. As discussed previously, if the problem has a symmetry axis, the use of an even $N_c$ will lead to a symmetrical solution.

In FIG. 9(f), a very refined grid was used. It shows a geometry similar to the geometry shown in FIG. 9(e); however, the four small legs (i.e., connections) that do not touch the domains walls in FIG. 9(e) are now complete and better formed. With the more refined grid, the current algorithm was capable of building four well-formed connections between the heat source area and the domain walls (heat sink). This configuration led to the minimum maximum temperature of all configurations shown in FIGS. 9(a)-(f).

Two Sources Problem

Figure 10:
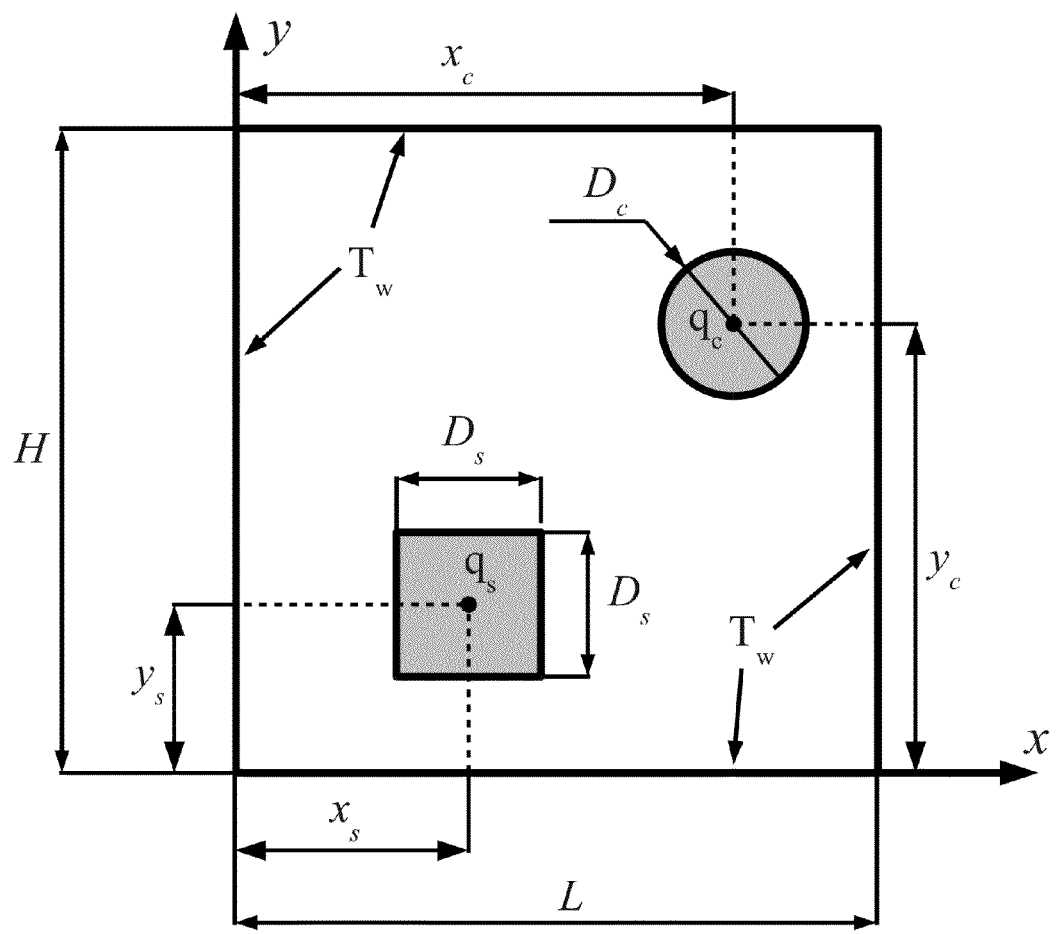
FIG. 10 is an illustration of the two sources problem, shown by two heat dissipating electronics.

As described and solved herein, a second heat source is added to the problem presented in FIG. 8, thereby creating a two sources problem. The two sources problem is illustrated in FIG. 10. The same computational domain (H×L) has two sources, one square with side length $D_s$, and one circular with diameter $D_c$, both shown in FIG. 10. The two heat sources have their center points located at $(x_s, y_s)$ and $(x_c, y_c)$, respectively. The total heat being generated within the two sources is constant and equal to $q_{gen} = q_c + q_s$.

Additional nondimensional variables are $$\tilde{D}_c = \frac{D_c}{A_0^{1/2}}, \phi_c = \frac{A_c}{A_0} = \frac{\tilde{D}_c^2}{\tilde{H}\tilde{L}} \quad (20)$$

Equation (16) applies to regions with heat generation. The new volumetric heat generation term assumes the form $$q''' = \frac{q_{gen}}{(A_c + A_s)W} \quad (21)$$

Applying Equation (21) to areas $A_c$ and $A_s$, the volumetric heat sources can be calculated as $$q_c''' = \frac{q_{gen}}{(A_c + A_s) \times 1} \frac{A_c}{(A_c + A_s) \times 1} \frac{q_{gen} A_c}{(A_c + A_s)^2} \quad (22)$$

and $$q_s''' = \frac{q_{gen}}{(A_c + A_s) \times 1} \frac{A_c}{(A_c + A_s) \times 1} \frac{q_{gen} A_s}{(A_c + A_s)^2}. \quad (23)$$

Combining Equations (15), (16), (18), (21), (22) and (23) the resulting heat conduction equations for the square and circular source regions are given by $$k\frac{\partial^2 \tilde{T}}{\partial x^2} + k\frac{\partial^2 \tilde{T}}{\partial y^2} + k_0 \left[ \frac{\pi}{4}\left(\frac{\tilde{D}_c}{\tilde{D}_s}\right)^2 + 1 \right]^{-1} = 0 \quad (24)$$

and $$k\frac{\partial^2 \tilde{T}}{\partial x^2} + k\frac{\partial^2 \tilde{T}}{\partial y^2} + k_0 \left[ \frac{4}{\pi}\left(\frac{\tilde{D}_s}{\tilde{D}_c}\right)^2 + 1 \right]^{-1} = 0. \quad (25)$$

Figure 11:
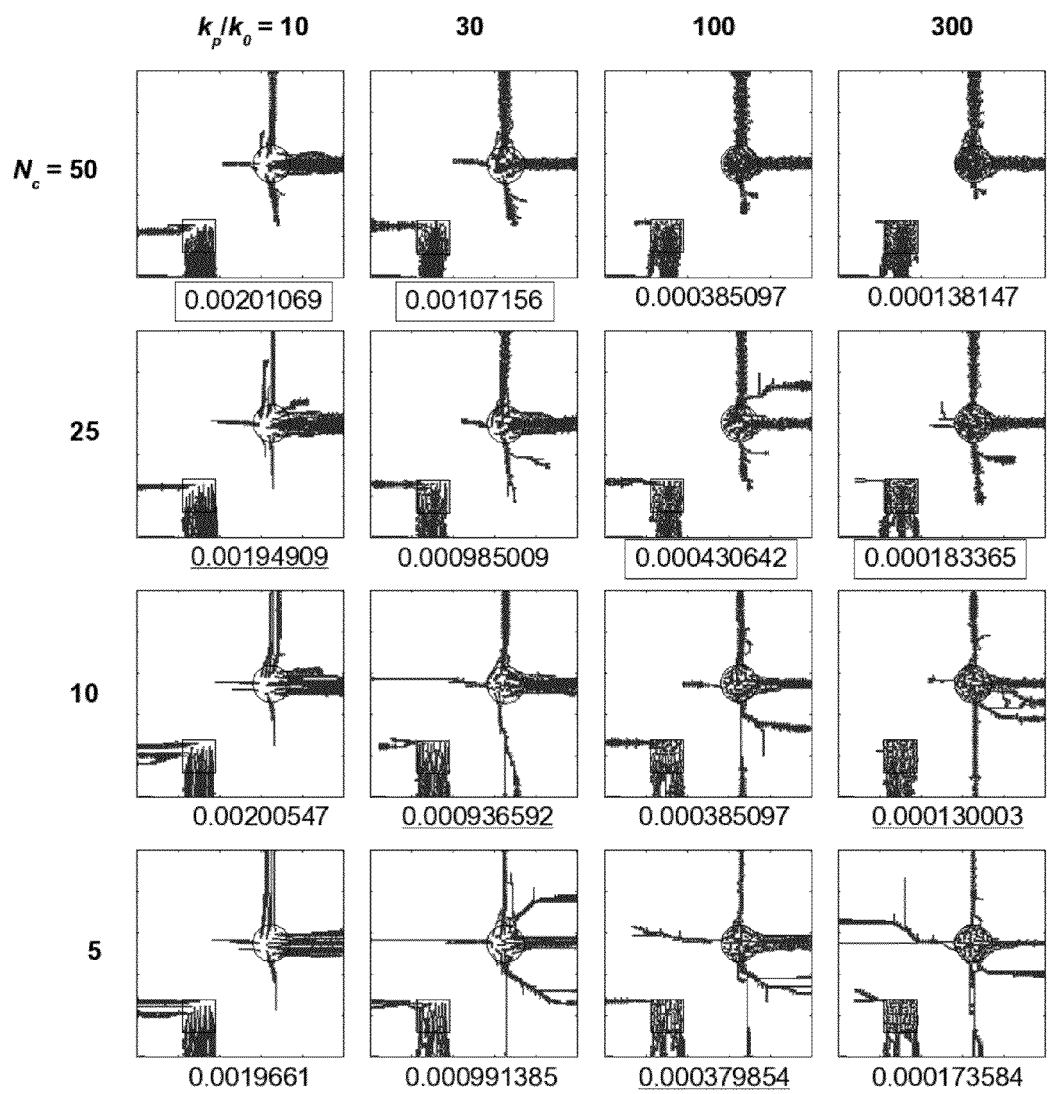
FIG. 11 is an illustration of dendritic cooling structures obtained by generating a dendritic high conductivity path for PCBs. A temperature analysis was conducted for the two sources problem for various $N_c$ and $k_p/k_0$ ($\Phi=0.1$, $\Phi_c=\Phi_s=0.025$, $(x_s,y_s)=(0.3,0.2)$, $(x_c,y_c)=(0.65,0.55)$, 18360 elements).

Results for various $N_c$ and $k_p/k_0$ parameters are shown in FIG. 11. In this figure, the central coordinates of the square and circular sources are $(\tilde{x}_s, \tilde{y}_s) = (0.3, 0.2)$ and $\tilde{x}_c, \tilde{y}_c = (0.65, 0.55)$, respectively. These values were chosen to guarantee the asymmetry of the problem. From FIG. 11, it is observed that each source establishes a high conductivity channel connection with the two closest walls (i.e., heat sinks) and that this connection is stronger (i.e., wider channel or multiple channels) with the closest wall. This result can be more clearly visualized for small $k_p/k_0$ and large $N_c$ values. The bottom wall is the closest to the squared source and the right wall is the closest to the circular source.

Similar to FIG. 6, it is not possible to associate the best performance with the $N_c$ variable (possibly due to mesh limitations). In the solutions depicted in FIG. 6 with the temperatures values inside a box (worst case in each column), unfinished heat channels are seen not to reach the domain walls. The best solutions (i.e., underlined temperatures), seem to be associated with narrow and mostly complete heat channels.

Based in the constructal principle, optimized forms can be obtained by the minimization of the heat flow resistance. The current methodology was used to implement an efficient numerical algorithm that, with a non-iterative procedure, is capable of generating optimized geometries for composite plates consisting of two materials of different thermal conductivities with uniform or localized heat sources.

The elemental construct geometry is given by the size and shape of the elements being replaced (dictated by the mesh), and the assembly levels (higher constructs) correspond to the number of times that $N_c$ low conductivity elements have been placed within the domain.

The results have been validated by comparison with conventional art's constructal solutions. Results showed that (1) the structures obtained are a function of the grid and the number of elements exchanged in each solution step ($N_c$); (2) the structures that emerge are highly dependent upon the thermal conductivity ratio of the two materials; and (3) for a symmetric problem, if an even number of element $N_c$ is replaced, the resulting structure will exhibit symmetry, and if $N_c$ is an odd number, an asymmetric structure will appear; and (4) the methodology does not preclude isolated high conductivity patches from appearing, though the results indicate that the tree-like and dendritic structures arise naturally.

Additionally, two cases of localized heat sources are considered to demonstrate the capability of the current methodology to determine desirable structures for the high conductivity paths. They also demonstrate that an increase in the complexity of the problem does not significantly increase the complexity of the current invention. As long as the numerical method used to solve the energy equation can solve the thermal problem, the same or substantially similar algorithm can be applied.

DEFINITIONS OF CLAIM TERMS

Asymmetric: This term is used herein to refer to the exchange of low conductivity material and high conductivity material resulting in a disproportionate arrangement of elements within a domain. Typically, an odd number of material exchanges will result in an asymmetric tree-like pattern or formation. In an asymmetric shape, the base plate typically cannot be divided into two parts that have exactly the same low and high conductivity material arrangement.

Base plate: This term is used herein to refer to any foundation or support, typically planar, that undergoes heating and cooling processes. For example, computer or PCBs may contain base plates that are heated through function of the computer or PCB. A goal of the current invention is to minimize the maximum temperature in a base plate.

Conductivity: This term is used herein to refer to a material's ability to conduct heat or transfer heat across the material. Thus, heat transfer across materials of high thermal conductivity occurs at a higher rate than across materials of low thermal conductivity.

Discretize: This term is used herein to refer to converting a continuous space into equivalent discrete spaces.

Domain: This term is used herein to refer to any base (e.g., physical, computational, mathematical, etc.) that can be divided and analyzed for heat transfer.

Element: This term is used herein to refer to one part or principle of a domain for analysis of heat transfer.

Elemental construct: This term is used herein to refer to a frame or geometry given by the size and shape of the elements being replaced (dictated by the mesh). The assembly levels (higher constructs) correspond to the number of times that low conductivity elements have been replaced with high conductivity elements within a domain. An "elemental construct" can contain both low conductivity elements and high conductivity elements.

Heat flow resistance: This term is used herein to refer to the opposition of heat transfer between physical systems, for example between the interior of a domain or base plate and the external ambient. By minimizing "heat flow resistance", heat can transfer more freely from the domain interior to the external ambient, thereby minimizing maximum temperature within the domain interior.

Heat sink: This term is used herein to refer to any heat exchanger component that dissipates heat from the interior of a device to an environment external to the device. Efficient heat sinks may try to maximize the amount of its surface area in contact with the external environment. A heat sink may be a connection between a heat source and the external environment. It is contemplated that a heat sink may be active or passive in its dissipation of heat.

Heat source: This term is used herein to refer to any point of origin of thermal energy. The "heat source" can dispel thermal energy throughout a domain or elements contained therein.

Interlink: This term is used herein to refer to a spatial relationship of a plurality of objects, in which the objects are adjacent to and/or overlap each other. For example, two objects or materials may "interlink" by being adjacent to each other but not overlap (i.e., both lie in a plane) or by overlapping each other, or a combination thereof. Other typical spatial relationships are envisioned by interlinking as well.

Symmetric: This term is used herein to refer to the exchange of low conductivity material and high conductivity material resulting in a proportionate arrangement of elements within a domain. Typically, an even number of material exchanges will result in a symmetric tree-like pattern or formation. In a symmetric shape, the base plate typically can be divided into two parts that have exactly the same low and high conductivity material arrangement.

Temperature gradient field: This term is used herein to refer to a physical quantity indicating in which direction and at what rate the temperature or heat changes or flows among particular elements within a domain.

Temperature value: This term is used herein to refer to a measure of thermal energy within a domain or element contained therein.

Thermal threshold: This term is used herein to refer to a boundary condition or preset quantitative point at which a particular action is triggered or determination is made. For example, if a thermal value, such as a temperature gradient field, surpasses the threshold, then an indication may be made that the low conductivity material should be exchanged with high conductivity material.

Well-formed: This term is used herein to refer to efficiently formed connections between the heat source area and the domain walls (i.e., heat sinks).

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of minimizing heat flow resistance, comprising the steps of:
   discretizing a domain into a plurality of elements, said plurality of elements formed of low conductivity materials, said domain containing at least one heat source;
   generating heat from said heat source within said domain, said generated heat associated with temperature gradient fields among said plurality of elements, wherein said plurality of elements are localized such that said generated heat is not uniform among said plurality of elements;
   establishing at least one thermal threshold of said plurality of elements within said domain, said at least one thermal threshold associated with said temperature gradient fields;
   assessing said temperature gradient fields of said plurality of elements;
   determining one or more elements from said plurality of elements with a temperature gradient field above said threshold;
   exchanging said one or more elements with associated elements formed of high conductivity materials, thereby creating a modified configuration of said domain;
   verifying whether said modified configuration satisfies $A_p/A_0 < \Phi$, where $A_p$ is the area of elements formed of said high conductivity material, $A_0$ is the area of elements formed of said low conductivity material, and $\Phi$ is a pre-established maximum ratio of amount of said high conductivity material to amount of said low conductivity material;
   as a result of said modified configuration verified as true, performing the foregoing steps upon assessing said temperature gradient fields of said plurality of elements;
   as a result of said modified configuration verified as false, accepting said modified configuration as acceptable for minimizing maximum temperature of said domain, thereby minimizing heat flow resistance.

2. A method as in claim 1, further comprising the steps of:
   said generated heat further associated with a temperature value of said plurality of elements;
   said threshold further associated with said temperature value;
   assessing said temperature value of said plurality of elements; and
   determining said one or more elements from said plurality of elements with said temperature value above said threshold.

3. A method as in claim 1, further comprising:
   each adjacent element of said plurality of elements sharing at least one edge with each other.

4. A method as in claim 1, further comprising:
   the step of assessing said temperature gradient fields of said plurality of elements is accomplished by $$\left.\frac{\partial T}{\partial x}\right|_{s,t} = \sum_{i=1}^{4} \left.\frac{\partial N_i}{\partial y}\right|_{s,t} T_i \text{ and } \left.\frac{\partial T}{\partial y}\right|_{s,t} = \sum_{i=1}^{4} \left.\frac{\partial N_i}{\partial y}\right|_{s,t} T_i,$$

where s and t define a local coordinate system within said domain, N is a shape function, i is an index for said plurality of elements, x and y are the Cartesian coordinates, and T is the temperature.

5. A method as in claim 1, further comprising:
the step of exchanging said one or more elements with associated elements formed of high conductivity materials is accomplished by $$\Theta = \max\left(\left|\frac{\partial T}{\partial x}\right|, \left|\frac{\partial T}{\partial y}\right|\right),$$

where $\Theta$ is a scalar variable, T is the temperature, and x and y are the Cartesian coordinates.

6. A method as in claim 1, further comprising the step of:
optimizing a structure of said high conductivity material within said domain, said optimization guided by $$k\frac{\partial^2 T}{\partial x^2} + k\frac{\partial^2 T}{\partial y^2} + q''' = 0,$$

where T is the temperature, x and y are the Cartesian coordinates, and q''' is volumetric heat generation, and k can assume values of $k_0$ or $k_p$, where $k_0$ denotes low conductivity and $k_p$ denotes high conductivity.

7. A method as in claim 1, further comprising:
the step of exchanging said one or more elements with associated elements formed of high conductivity materials is performed symmetrically, such that two low conductivity elements selected from said one or more elements is replaced by two high conductivity elements.

8. A method as in claim 1, further comprising:
said one or more elements being an even number, thereby producing a symmetric modified configuration of said domain.

9. A method as in claim 1, further comprising:
said one or more elements being an odd number, thereby producing an asymmetric modified configuration of said domain.

10. A method as in claim 1, further comprising:
a number of said one or more elements and a speed of achieving minimization of said heat flow resistance having a direct relationship.

11. A method as in claim 1, further comprising:
said at least one heat source having a predetermined fixed location within said domain.

12. A method as in claim 1, further comprising the step of:
disposing high conductivity material within said at least one heat source to create well-formed heat sinks.

13. A method as in claim 1, further comprising the steps of:
establishing one or more heat sinks connecting said at least one heat source and the outer edges of said domain; and
lining said one or more heat sinks with high conductivity material.

14. A method as in claim 1, further comprising:
said at least one heat source including a plurality of heat sources.

15. A dendritic cooling system that minimizes heat flow resistance, comprising:
a base plate formed of low conductivity materials and high conductivity materials,
said low conductivity materials generating heat and said high conductivity materials transferring said generated heat to an exterior of said base plate, wherein a portion of said low conductivity materials and a portion of said high conductivity materials interlink,
said base plate having an elemental construct;
one or more heat sources disposed within said base plate to generate heat within said base plate; and
a plurality of dendritic heat sinks that dissipate said generated heat,
said high conductivity material disposed in one or more spatial regions of said base plate, said one or more spatial regions having a temperature gradient field above a preset threshold when said low conductivity materials are disposed in said one or more spatial regions,
said plurality of dendritic heat sinks resulting from a sequential replacement of said low conductivity materials by said high conductivity materials, said sequential replacement guided by said temperature gradient field above said preset threshold.

16. A dendritic cooling system as in claim 15, further comprising:
said one or more heat sources containing at least a portion of said high conductivity materials, such that said one or more heat sinks are well-formed.

17. A dendritic cooling system as in claim 15, further comprising:
said one or more heat sinks lined with said high conductivity materials.

18. A dendritic cooling system as in claim 15, further comprising:
said one or more heat sources including a plurality of heat sources.

19. A dendritic cooling system as in claim 15, further comprising:
said interlinked portions of high and low conductivity materials disposed in overlapping relation to each other.

20. A dendritic cooling system as in claim 19, further comprising:
said overlapping portions of high and low conductivity materials contained within said one or more heat sources.

* * * * *